(12) United States Patent
Priyanto et al.

(10) Patent No.: US 12,461,184 B2
(45) Date of Patent: Nov. 4, 2025

(54) ANGLE OF DEPARTURE ESTIMATION BASED ON CHANNEL IMPULSE RESPONSE

(71) Applicant: Sony Group Corporation, Tokyo (JP)

(72) Inventors: Basuki Priyanto, Lund (SE); Johan Hill, Lund (SE); Jose Flordelis, Lund (SE); Yan Shu, Lund (SE); Yujie Zhang, Lund (SE)

(73) Assignee: Sony Group Corporation, Tokyo (JP)

( * ) Notice: Subject to any disclaimer, the term of this patent is extended or adjusted under 35 U.S.C. 154(b) by 352 days.

(21) Appl. No.: 18/008,354

(22) PCT Filed: Jun. 17, 2021

(86) PCT No.: PCT/EP2021/066470
§ 371 (c)(1),
(2) Date: Dec. 5, 2022

(87) PCT Pub. No.: WO2021/255190
PCT Pub. Date: Dec. 23, 2021

(65) Prior Publication Data
US 2023/0280438 A1    Sep. 7, 2023

(30) Foreign Application Priority Data
Jun. 18, 2020 (SE) .................................. 2030202-2

(51) Int. Cl.
*G01S 5/00* (2006.01)
*G01S 1/08* (2006.01)
*H04L 25/02* (2006.01)

(52) U.S. Cl.
CPC .............. *G01S 5/0036* (2013.01); *G01S 1/08* (2013.01); *H04L 25/0212* (2013.01); *G01S 2205/007* (2013.01)

(58) Field of Classification Search
CPC .... G01S 5/0036; G01S 1/08; G01S 2205/007; H04L 25/0212
See application file for complete search history.

(56) References Cited

U.S. PATENT DOCUMENTS

| | | | | |
|---|---|---|---|---|
| 2010/0081451 | A1* | 4/2010 | Mueck | H04W 4/025 455/456.1 |
| 2015/0188678 | A1* | 7/2015 | Wu | G01S 1/14 455/456.6 |

(Continued)

FOREIGN PATENT DOCUMENTS

| | | | | |
|---|---|---|---|---|
| EP | 3963971 B1 * | 4/2025 | | H04W 72/1268 |
| KR | 20120047694 A | 5/2012 | | |

(Continued)

OTHER PUBLICATIONS

International Search Report and Written Opinion from corresponding International Application No. PCT/EP2021/066470, mailed on Oct. 4, 2021, 15 pages.

(Continued)

*Primary Examiner* — Khai M Nguyen
(74) *Attorney, Agent, or Firm* — Tucker Ellis LLP (57) ABSTRACT

A method of operating a wireless communication device (102) connectable to a communications network is provided. The communications network includes an access node (101, 101-1, 101-2, 101-3). The method includes: monitoring for a plurality of reference signals (121, 122, 123) of a transmission (351) in a plurality of resources, the transmission being provided by the access node (101, 101-1, 101-2, 101-3); and based on said monitoring: participating in positioning of the wireless communication device (102) depending on an indicator indicative of at least one of a magnitude or a phase of at least one first path component (810) of an impulse response (800, 801) of a radio channel, the at least one first path component being associated with (Continued)

at least one reference signal (121, 122, 123) of the plurality of reference signals (121, 122, 123) of the transmission (351).

20 Claims, 7 Drawing Sheets

(56) References Cited

U.S. PATENT DOCUMENTS

| | | | |
|---|---|---|---|
| 2019/0090092 A1* | 3/2019 | Hwang | G01S 5/0215 |
| 2020/0053719 A1 | 2/2020 | Sadiq | |
| 2021/0048500 A1* | 2/2021 | Manolakos | G01S 5/0063 |

FOREIGN PATENT DOCUMENTS

| | | | |
|---|---|---|---|
| WO | WO-2014154293 A1 * | 10/2014 | H04B 7/0408 |
| WO | 2018087280 A1 | 5/2018 | |
| WO | 2018202056 A1 | 11/2018 | |
| WO | WO-2020069083 A1 | 4/2020 | |
| WO | WO-2020090120 A1 | 5/2020 | |
| WO | WO-2021252762 A1 * | 12/2021 | G01S 7/006 |

OTHER PUBLICATIONS

Office Action and Search Report from corresponding Swedish Application No. 2030202-2, mailed on Mar. 29, 2021, 9 pages.
Intel Corporation, "Analysis of techniques for NR DL Positioning", 3rd Generation Partnership Project (3GPP) TSG RAN WG1 Ad-Hoc Meeting 1901, R1-1900512, Jan. 21-25, 2019, 25 pages.

* cited by examiner

ANGLE OF DEPARTURE ESTIMATION BASED ON CHANNEL IMPULSE RESPONSE

TECHNICAL FIELD

Various aspects of the disclosure generally relate to positioning of a wireless communication device using positioning reference signals. Various examples of the disclosure specifically relate to estimating an angle of departure of a transmission directed towards the UE based on one or more characteristics of the channel impulse response as determined based on positioning reference signals, e.g., a first path component of the channel impulse response.

BACKGROUND

To position mobile devices such as wireless communication devices (sometimes also referred to as user equipment; UE) various positioning techniques are known. Generally, positioning techniques include cellular positioning techniques and non-cellular positioning techniques. Examples of non-cellular positioning techniques include, e.g., satellite-based positioning or use of gyroscopes. Cellular positioning techniques can rely on the use of cell-identity tracking or dedicated positioning reference signals (PRSs) that are transmitted by a first node and received by a second node. It is then possible to determine one or more of the following: a time of arrival (ToA), more specifically a time-difference of arrival (TDoA) or a multi-round trip time (Multi-RTT); an angle of arrival (AOA); and/or an angle of departure (AOD).

There is a general trend towards more accurate positioning. For instance, according to the Third Generation Partnership Project (3GPP), Release 17, an enhancement of the positioning accuracy is aimed for in RAN1 working group #101e, May 2020. See 3GPP RP-193237 (New SID on NR Positioning Enhancements). To address higher accuracy requirements for positioning resulting from new applications and industry verticals, enhancements in existing positioning techniques are considered to meet the following exemplary performance targets: for general commercial use cases such as specified in 3GPP Technical Specification (TS) 22.261, a sub-meter level positioning accuracy; and for industrial internet-of-things (IIoT) use cases a positioning accuracy of not more than 0.2 m.

SUMMARY

Accordingly a need exists for advanced positioning. In particular, a need exists for positioning that enables the estimation of a position of a mobile device, e.g., a UE, at comparably high accuracy.

This need is met by the features of the independent claims. The features of the dependent claims define further examples.

Hereinafter, techniques will be described that facilitate positioning of a UE. This positioning can be based on an AOD estimation. Reference signals—e.g., PRSs—of a transmission including multiple resources—e.g., a multi-beam transmission—can be used. Based on monitoring the reference signals at the UE, one or more characteristics of a channel impulse response (CIR) of the channel between the transmitting node—e.g., base station (BS) or another access node—and the UE can be determined. Then, the positioning can be based on the one or more characteristics of the CIR.

One example characteristic that can be used to perform the positioning of the UE is utilizing the first path component of the CIR. It has been found that by using the first path component of the CIR to estimate the AOD, the accuracy with which the AOD can be estimated can be particularly high, e.g., if compared to prior-art techniques that rely, e.g., on the Reference Signal Received Power (RSRP)—then integrated across multiple paths of the channel—to estimate the AOD.

According to examples described herein, it is possible to characterise the CIR of the radio channel by determining multiple first path components using reference signals of the transmission transmitted in different ones of the multiple resources, i.e., using different transmission spatial filters, i.e., different transmit beams. A CIR indicator can be determined that is indicative of at least one of these first path components.

A method of operating a UE is provided. The UE is connectable to a communications network. The communications network includes an access node. The method includes monitoring for a plurality of reference signals of a transmission. The transmission is in a plurality of resources. The transmission is provided by the access node. The method also includes participating in positioning of the UE based on said monitoring. Said positioning depends on an indicator that is indicative of at least one of a magnitude or a phase of at least one first path component of an impulse response of the radio channel. The at least one first path component is associated with at least one reference signal of the plurality of reference signals of the transmission.

The transmission can be a multi-beam transmission. Different resources can be associated with different transmit beams.

A computer program or a computer-program product or a computer-readable storage medium includes program code. The program code can be loaded and executed by least one processor. Upon executing the program code, the at least one processor performs a method of operating a UE. The UE is connectable to a communications network. The communications network includes an access node. The method includes monitoring for a plurality of reference signals of a transmission. The transmission is in a plurality of resources. The transmission is provided by the access node. The method also includes participating in positioning of the UE based on said monitoring. Said positioning depends on an indicator that is indicative of at least one of a magnitude or a phase of at least one first path component of an impulse response of the radio channel. The at least one first path component is associated with at least one reference signal of the plurality of reference signals of the transmission.

A UE includes a control circuitry. The control circuitry is configured to perform a method of operating the UE. The UE is connectable to a communications network. The communications network includes an access node. The method includes monitoring for a plurality of reference signals of a transmission. The transmission is in a plurality of resources. The transmission is provided by the access node. The method also includes participating in positioning of the UE based on said monitoring. Said positioning depends on an indicator that is indicative of at least one of a magnitude or a phase of at least one first path component of an impulse response of the radio channel. The at least one first path component is associated with at least one reference signal of the plurality of reference signals of the transmission.

A method of operating a network node of a communications network is provided. The method includes receiving a message indicative of an indicator indicative of at least one of the magnitude or phase of a least one first path component of an impulse response of a radio channel. The indicator is received from a UE. The at least one first path component is associated with at least one reference signals of a plurality of reference signals of a transmission in multiple resources. The transmission is provided by an access node of the communication network. The method also includes estimating an AOD of the at least one reference signal based on the indicator indicative of the at least one of the magnitude or the phase of the at least one first path component.

A computer program or a computer-program product or a computer-readable storage medium includes program code. The program code can be loaded and executed by least one processor. Upon executing the program code, the at least one processor performs a method of operating an access node of a communications network. The method includes receiving a message indicative of an indicator indicative of at least one of the magnitude or phase of a least one first path component of an impulse response of a radio channel. The indicator is received from a UE. The at least one first path component is associated with at least one reference signals of a plurality of reference signals of a transmission in multiple resources. The transmission is provided by an access node of the communication network. The method also includes estimating an AOD of the at least one reference signal based on the indicator indicative of the at least one of the magnitude or the phase of the at least one first path component.

An access node of a communications network includes a control circuitry. The control circuitry is configured to perform a method of operating the access node. The method includes receiving a message indicative of an indicator indicative of at least one of the magnitude or phase of a least one first path component of an impulse response of a radio channel. The indicator is received from a UE. The at least one one first path component is associated with at least one reference signals of a plurality of reference signals of a transmission in multiple resources. The transmission is provided by an access node of the communication network. The method also includes estimating an AOD of the at least one reference signal based on the indicator indicative of the at least one of the magnitude or the phase of the at least one first path component.

It is to be understood that the features mentioned above and those yet to be explained below may be used not only in the respective combinations indicated, but also in other combinations or in isolation without departing from the scope of the disclosure.

DETAILED DESCRIPTION OF EMBODIMENTS

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, examples of the disclosure will be described in detail with reference to the accompanying drawings. It is to be understood that the following description of examples is not to be taken in a limiting sense. The scope of the disclosure is not intended to be limited by the examples described hereinafter or by the drawings, which are taken to be illustrative only.

Hereinafter, techniques of location estimation (sometimes also referred to as positioning) of a mobile device are described. In particular, positioning in a communications network—e.g., a cellular network—is described. Here, reference signals—e.g., PRSs—are transmitted by an access node of the communications network, wherein the reference signals are transmitted on resources allocated in a time-frequency resource grid of the communications network also used for transmitting data.

Hereinafter, techniques are described for illustrative purposed in the context of PRSs, but similar techniques may be implemented based on other types of RSs, e.g., sounding reference signals (SRSs).

Hereinafter, various techniques will be described in the context of an implementation of the communications network as a 3GPP cellular network, e.g., according to the Long Term Evolution (LTE) protocol or according to the New Radio (NR) protocol. These are examples and other implementations are conceivable.

As a general rule, it would be possible to use a downlink (DL) transmission of PRSs, i.e., of a transmission from an access node to a UE. Alternatively or additionally, said positioning may rely on an uplink (UL) transmission of PRSs. It would also be possible to rely on sidelink PRSs transmitted between two UEs. Hereinafter, for illustrative purposes, techniques are described in connection with a DL transmission of PRSs; but similar techniques may be readily applied to, e.g., an UL transmission or a sidelink transmission.

Hereinafter, positioning is described based on estimation of an AOD. The AOD can describe a direction into which signals can be transmitted to arrive at the UE to-be-positioned on a direct path.

A PRS transmission can use multiple resources. The PRS transmission can be implemented on multiple beams (i.e., using transmit beamforming). The multi-beam transmission can be in a form of a beam-swept DL transmission. Different beams are associated with different spatial precoding/spatial transmission filters and, accordingly, address different spatial paths of the radio channel associated with different AODs from the access node. A transmission of a PRS for a spatial transmission filter occupies a resource, named as PRS resource. The PRS multi-beam transmission can employ a PRS resource set including multiple PRS resources, e.g., each being associated with a respective spatial transmission filter. An example implementation of a PRS resource set is provided by: 3GPP TS 38.214 V16.1.0 (2020-03), section 5.1.6.5.

As a general rule, the UE can receive one or more configuration messages indicative of the time-frequency resource allocation of the PRSs resource set, e.g., subcarrier spacing, frequency reference, etc. Using such configuration message, the UE can monitor for the plurality of PRSs of the multi-beam PRS transmission.

Based on one or more receive properties of the PRSs at the UE, it is then possible to conclude which spatial channel is directed towards the UE. Based on this, the AOD can be estimated.

Thus, the AOD is indicative of the relative position/location of the UE with respect to the BS. Typically, the position of the BS is known in a global coordinate system and thus, it is possible to infer the position of the UE also in the global coordinate system.

According to various examples described herein, such positioning is based on a CIR of the radio channel. The CIR can be determined based on a channel model. The channel model aims to provide a mathematical representation of the propagation of radio signals along a radio channel. Typically, the radio channel is assumed to be impacting the signal transmission in a linear fashion, e.g., using a multi-path model including fading. Accordingly, it can be described by an impulse response. In signal processing, the impulse response, or impulse response function (IRF), of a dynamic and linear system—here, the radio channel—is its output when presented with a brief input signal, called an impulse. Mathematically, the impulse can be modeled as a Dirac delta function for continuous-time systems, or as the Kronecker delta for discrete-time systems. Once the impulse response of a radio channel is known, this CIR can be used to predict the impact of the radio channel to any input signal shape. There are various options available for representing the CIR in mathematical terms. The CIR can be represented as a channel matrix. Another option is to represent the CIR using the PDP of a signal delay, measured relative to zero delay or the first detectable signal.

Various techniques are based on the finding that in the context of time-of-arrival (TOA) measurements as part of DL relative signal time difference (RSTD) measurement (3GPP TS 38.215 V16.0.1 (2020-01), section 5.1.28), it is possible, according to prior-art techniques, to determine the delay of the first spatial path component (hereinafter, simply first path component, FPC) of the CIR so as to estimate the time difference of arrival based thereon. The CIR can be derived from a prior-art Reference Signal Time Difference (RSTD) measurement. According to various examples, it is possible to reuse such TOA-based positioning techniques of determining the CIR for estimating the AOD in AOD-based positioning.

More specifically, the positioning described herein can be based on the FPC of the CIR. The FPC is typically defined as the fraction of the CIR at which the magnitude of the PDP of the CIR crosses a predefined threshold for the first time (starting from zero delay). Thus, the FPC corresponds to the shortest significant path between the transmitter node and the receiver node.

This is in contrast to prior-art implementations according to which the positioning—in particular determining of the AOD—is based on a RSRP of the received PRS (3GPP TS 37.355 V16.0.0 (2020-03) Section 6.5.11.4). Hence, it is essentially accumulated across the entire CIR. By restricting the positioning process to using the first path of the CIR, a more accurate AOD-based positioning becomes possible.

According to various examples, the UE monitors for a plurality of PRSs in a plurality of PRS resources of a multi-beam transmission (e.g., a beam-swept PRS transmission) provided by a BS. The UE then participates in positioning of the UE. This participation is based on said monitoring and depends on an indicator indicative of at least one of the magnitude or a phase of one or more FPCs of the CIR of the radio channel. The one or more FPCs can be determined based on said monitoring in different ones of the resources (e.g., of a PRS resource set) of the multi-beam transmission. I.e., different FPCs can be determined based on different PRSs received at the UE.

This indicator indicative of the at least one FPC of the CIR associated with at least one PRS resource is, hereinafter, referred to as CIR indicator.

As a general rule, the CIR indicator could be indicative of the FPCs for all resources of the PRS resource set, or only a sub-fraction thereof.

As a general rule, the CIR indicator could be expressed/represented as a complex value—then, describing both magnitude, as well as phase—or as a scalar value—then either describing magnitude, or phase.

As a further general rule, the UE could participate in said positioning either based on reporting the CIR indicator to the cellular network, e.g., to a location-server node (LS node) of the cellular network.

Such reporting can be implemented as follows: The UE can transmit a respective message that is indicative of the CIR indicator. For example, the message can include the CIR indicator. It would also be possible that the message only includes a part of the CIR indicator: for instance, the CIR indicator could be indicative of the FPCs determined based on the PRSs of all N resources of the PRS resource set of the multi-beam transmission; and, the message could include only a fraction of this CIR indicator, e.g., associated with M<N resources of the PRS resource set corresponding to the best FPCs, e.g., the strongest or relatively strongest FPCs.

Then, the LS node of the communications network can estimate the AOD based on the received message indicative of the CIR indicator, i.e., based on the CIR indicator. Alternatively or additionally, it would be possible that the UE participates in said positioning by estimating the AOD locally based on the CIR indicator and then reports the AOD to the LS node.

These two options are summarized in TAB. 1 below.

TABLE 1

Different variants for distributing the logic to estimate the AOD.

| Variant | Estimating AOD | Explanation |
|---|---|---|
| A | At UE (UE-based positioning) | The UE can estimate the AOD based on the CIR indicator. For example, the UE may use a complex representation of the CIR indicator. To simplify the calculation, it would also be possible that the UE uses the magnitude of the CIR indicator only. |

TABLE 1-continued

Different variants for distributing the logic to estimate the AOD.

| Variant | Estimating AOD | Explanation |
|---|---|---|
| | | Assuming the UE has sufficient information, including the PRS beam configuration, the UE can then report the estimated AOD to the cellular network. The UE could indicate that the AOD has been estimated using the CIR indicator (e.g., if compared to prior-art techniques which estimate the AOD based on the RSRP). |
| B | At Network, e.g., LS node | A network node - e.g., the LS node - can estimate the AOD based on a corresponding report received from the UE. The UE can transmit a message that is indicative of the CIR indicator. For example, the message could include a complex representation of the CIR indicator, or a non-complex, real-valued representation. For instance, the message could include the magnitude of the CIR indicator. |

The aforementioned approach to estimate the AOD based on one or more characteristics of the CIR can be used to complement the prior-art scenarios to estimate the AOD based on the RSRP of PRSs. For example, if the quality of the FPC of the CIR is bad or it does not meet a required threshold, the UE can only report the RSRP for AOD estimation (but not the CIR indicator). Otherwise—e.g., when the FPC is good, i.e., fulfills one or more quality requirements—, the UE may report the value (either complex or absolute) of the CIR indicator. Alternatively, the LS can ask the UE to provide both the RSRP and the CIR indicator for AOD estimation. Thus, generally speaking, it is possible that whether the UE participates in the AOD positioning based on the CIR indicator or not depends on one or more trigger criteria to be checked at the UE.

Figure 1:
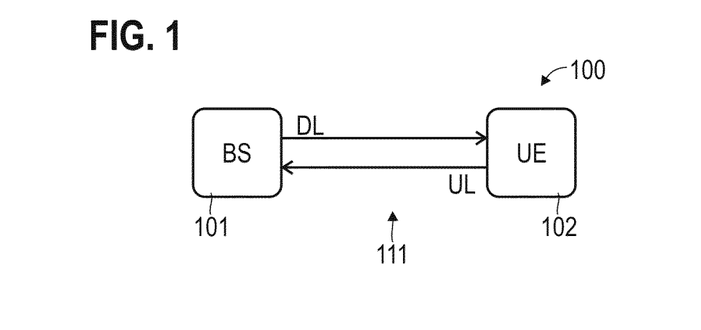
FIG. 1 schematically illustrates a communication system including a BS and a UE according to various examples.

FIG. 1 schematically illustrates a communication system 100. The communication system 100 includes two nodes 101, 102 that are configured to communicate with each other on a radio channel 111. The radio channel 111 can include one or more paths (sometimes referred to as spatial streams) that can be used separately or coherently to transmit data, e.g., when relying on Multiple-Input Multiple-output (MIMO) techniques.

In the example of FIG. 1, the node 101 is implemented by an access node, more specifically a BS of a cellular network. In 5G NR, it is known as gNB. The node 102 is implemented by a UE.

The techniques described herein are not limited to such a scenario of a cellular network. Other types of communications networks could be employed, e.g., a Wi-Fi mesh network, etc.

Figure 2:
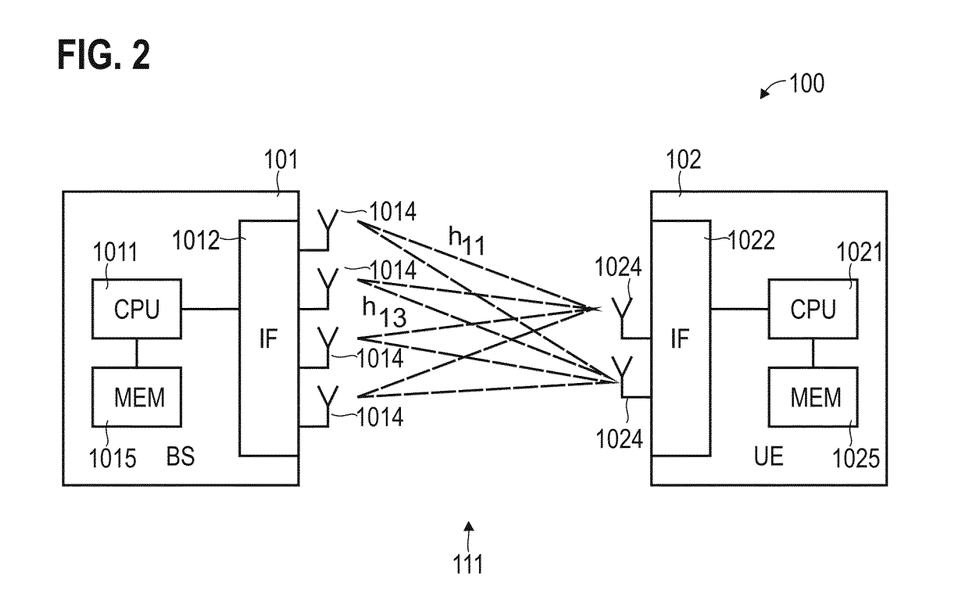
FIG. 2 schematically illustrates details of the communication system of FIG. 1.

FIG. 2 schematically illustrates aspects with respect to the BS 101. The BS 101 includes control circuitry that is implemented by a processor 1011 and a non-volatile memory 1015. The processor 1011 can load program code that is stored in the memory 1015. The processor 1011 can then execute the program code. Executing the program code causes the processor to perform techniques as described herein, e.g.: participating in a positioning of the UE 102, e.g., by transmitting PRSs and/or by receiving PRSs from the UE 102; performing a transmission of PRSs in multiple resources, e.g., of a PRS resource set; performing a multi-beam transmission, e.g., a beam-swept transmission, e.g., of PRSs; applying spatial precoding or analog beam forming in a specific azimuth and elevation to signals transmitted via a wireless interface 1012 using an array of antennas 1014, i.e., using transmit beamforming, e.g., to transmit the PRSs or implementing a beam-swept transmission; etc.

FIG. 2 also illustrates aspects with respect to the UE 102. The UE 102 includes control circuitry that is implemented by a processor 1021 and a non-volatile memory 1025. The processor can load program code from the memory 1025 and execute the program code. Executing the program code causes the processor to perform techniques as described herein, e.g.: monitoring for PRSs, e.g., transmitted by the access node 101 or another UE on a sidelink, e.g., using a PRS resource set and/or a multi-beam transmission; transmitting PRSs; measuring one or more receive properties of PRSs, e.g., a receive amplitude and/or received phase; applying transmit beamforming and/or receive beamforming; determining a CIR based on one or more receive properties of PRSs; determining a CIR indicator indicative of a FPC of the CIR; participating in positioning of the UE, e.g., by determining the CIR indicator and/or establishing the AOD of PRSs reaching the UE on the FPC of the CIR; participating in positioning of the UE by reporting the CIR indicator to the cellular network, e.g., to a LS node; participating in positioning of the UE by reporting the AOD estimated based on RSRP and/or the CIR indicator; etc.

FIG. 2 also illustrates aspects with respect to communicating between the BS 101 and the UE 102 on the radio channel 111. The BS 101 includes an interface 1012 that can access and control multiple antennas 1014. Likewise, the UE 102 includes an interface 1022 that can access and control multiple antennas 1024.

The interfaces 1012, 1022 can each include one or more transmitter chains and/or one or more receiver chains. For instance, such receiver chains can include low noise amplifiers, analogue to digital converters, mixers, etc. Analogue and/or digital beamforming is possible. Transmit beamforming and receive beamforming can be applied, i.e., signals can be precoded. A MIMO communication system 100 can be implemented.

Where multiple different spatial filters are applied (typically sequentially) to transmit signals, this is referred to as a multi-beam transmission.

Figure 3:
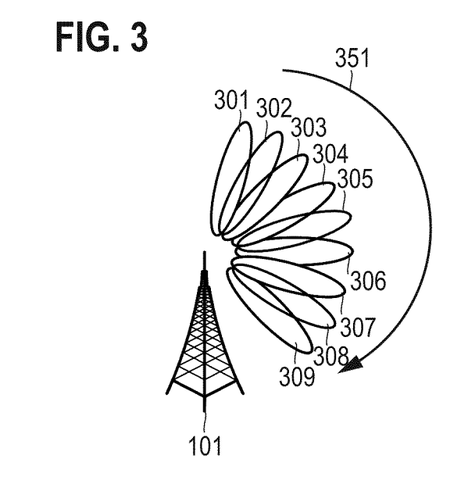
FIG. 3 schematically illustrates a multi-beam transmission according to various examples.

FIG. 3 schematically illustrates a multi-beam transmission 351 including spatial filters 301-309, all characterized by different AODs thereby addressing different paths of the radio channel 111. These spatial filters are also referred to as beams 301-309.

Different beams 301-309 can be associated with using different time-frequency resource elements of the time-frequency resource grid, e.g., defined by Orthogonal Frequency Division Multiplex (OFDM) modulation, for the respective signal(s). These resources of the multi-beam transmission 351 form a resource set. The smallest granularity of the time-frequency resource grid can pertain to the frequency of a OFDM subcarrier and the OFDM symbol duration. By transmitting on the different beams 301-309 in accordance with the predefined time-frequency resource allocation, it is possible to infer which beam was used to transmit a signal received by the UE 102 based on the time-frequency resource identity. The time-frequency resource element of a PRS transmission in one of the beams 301-309 is called a PRS resource. The PRS resources for all different beams 301-309 is called a PRS resource set.

As a general rule, the receiver receives a signal y that is obtained from an input signal x multiplied by the transmission matrix H of the radio channel 111. FIG. 2 includes two example labels for the components $h_{11}$ and $h_{13}$ of the transmission matrix H. The transmission matrix H observed over the bandwidth of the system defines the defines the CIR of the radio channel 111. The rank of the transmission matrix corresponds to the number of linearly independent rows or columns and, as such, indicates how many independent data streams on different paths can be used simultaneously; this is sometimes referred to as the number of layers.

The CIR can be quantified by various indicators, beyond the transmission matrix H. One example on which various techniques described herein can rely is an indicator indicative of the magnitude and/or phase of one or more FPCs of the CIR (CIR indicator): The complex value—thus representing both magnitude and phase of this FPC—at the FPC delay $\tau_{FP}$ in the cross-correlation $R_l(\tau_{FP})$ can be denoted as:

$$R_l(\tau_{FP}) = g(\tau_{FP}, \phi_{UE}) P_l(\tau_{FP}) + v_l, \quad (1)$$

where l is the index of the beams l resources of the multi-beam transmission, g is the complex coefficient depending on channel fading and receive antenna gain—i.e., associated with the channel matrix H –, $\phi_{UE}$ denotes the AOD, $P_l(\phi)$ is the beam pattern (spatial transmission filter) of the l-th beam of a multi-beam transmission 351 (typically predefined and known), $v_l$ is the sum of the UE receiver noise and the measurement error of $R_l$, e.g., Gaussian noise.

For example, for l=1 the CIR indicator would be indicative of a single FPC of the CIR associated with a single PRS. For l>1 the CIR indicator would be indicative of multiple FPCs of the CIR associated with multiple PRSs transmitted on different beams of the multi-beam transmission.

Figure 4:
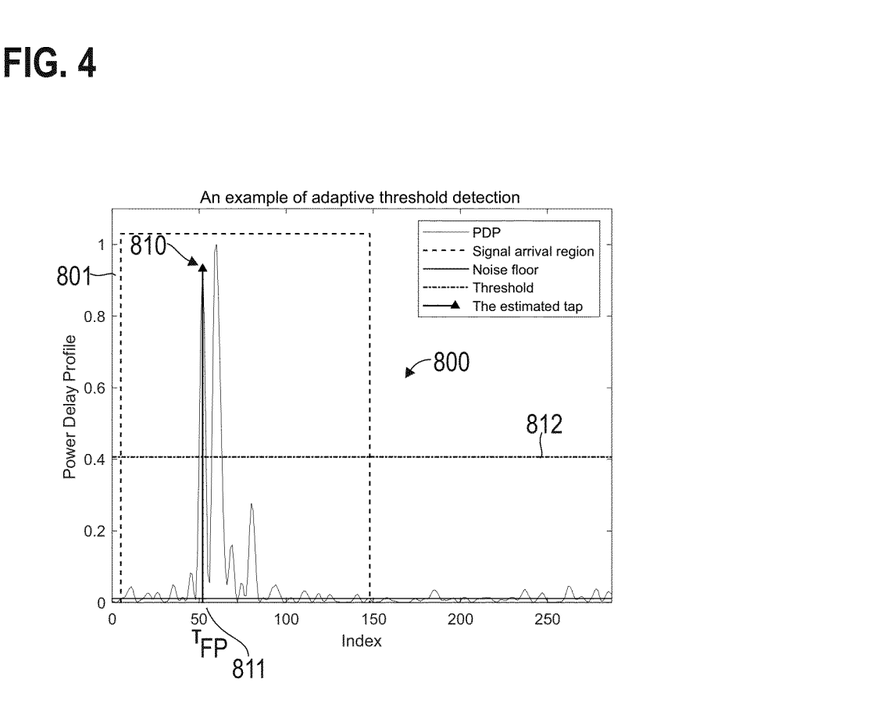
FIG. 4 illustrates a power density profile (PDP) of a CIR and specifically illustrates a first path component of the CIR according to various examples.

FIG. 4 schematically illustrates the CIR 800 in terms of the PDP 801, e.g., obtained by using the squared magnitude of the CIR. The power is plotted as a function of delay time (here illustrated in arbitrary units). The power is normalized to 1 across the various delays. The vertical arrow highlights the FPC delay $\tau_{FP}$ 811—which is defined as the PDP crossing a predefined threshold 812. The respective magnitude of the FPC 810 is labeled.

For a specific scenario of an OFDM-based time-frequency resource grid including PRS, a cross-correlation to calculate the CIR indicator of Eq. (1) can be implemented as follows:

$$R_k[n_\tau] = \frac{1}{M - |n_\tau|} \sum_{i=n_\tau}^{L_\tau} x_k[i] * y_k^*[i - n_\tau], \quad (2)$$

where k is the index of OFDM symbol of resource elements carrying a PRS, $n_\tau$ is the index of the $R_k$ samples, $L_\tau$ is the length of the cyclic prefix, x is the replica of the transmitted PRS (i.e., denotes the input signal shape of the respective PRS, which is known by definition), M is the FFT size or a multiple thereof, and y is the received resource elements carrying the PRS (i.e., denotes a received signal shape of the respective PRS). Eq. (2) corresponds to discrete values of the index $n_\tau$, which corresponds to the delay $\tau$ of Eq. (1).

The CIR indicator is determined based on multiple PRS resources or all PRS resources within a PRS resource-set (i.e., different index values l in Eq. (1)).

Eq. (2) can be re-executed for multiple PRSs (transmitted on different beams) received by the UE when monitoring for the PRSs of the multi-beam transmission. The index l is omitted from Eq. (2) for sake of simplicity.

Eq. (2) implements a PRS-based measurement. Such measurement could be standardized. Such measurement could be activated/deactivated by the cellular network. For instance, the UE 102 may execute such measurement upon receiving a respective activation request from communications network. This is typically sent by LS to UE using LPP protocol.

The CIR indicator can be used for positioning the UE, more specifically for estimating the AOD. Details with respect to such positioning are illustrated in FIG. 5.

Figure 5:
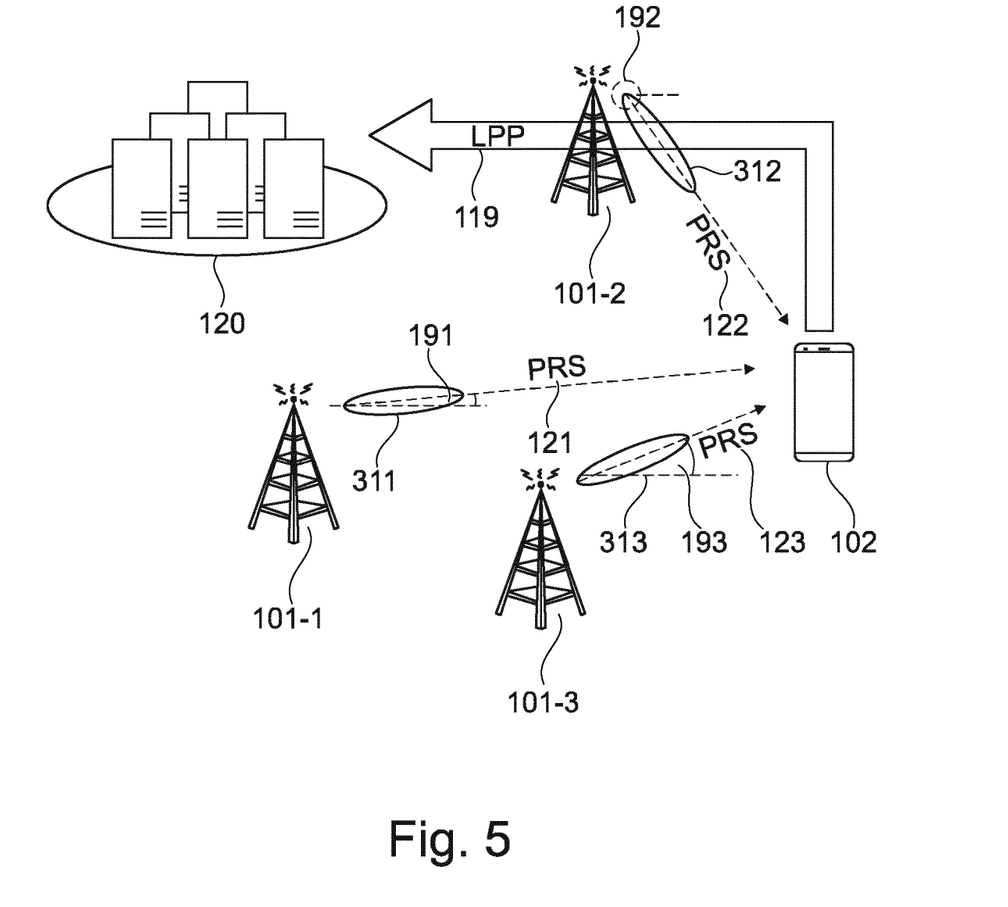
FIG. 5 schematically illustrates positioning of a UE according to various examples.

FIG. 5 schematically illustrates aspects with respect to positioning of the UE 102. In the illustrated scenario, both the UE 102 as well as a LS node 120 participate in the positioning of the UE 102. The UE 102 and the LS node 120 can communicate using a positioning protocol 119, e.g., LTE positioning protocol (LPP) as specified in 3GPP TS 37.355 V16.0.0 (2020-03) (while unidirectional communication is illustrated in FIG. 5, as a general rule, bidirectional communication according to the positioning protocol would be possible).

In the scenario of FIG. 5, multiple BSs 101-1-101-3 transmit PRSs 121-123 to facilitate said positioning.

As a general rule, each one of the BSs 101-1-101-3 may use a multi-beam transmission 351 (cf. FIG. 3; in FIG. 5, only those beams 311-313 are illustrated addressing the strongest paths, thereby defining the AODs 191-193). As illustrated in FIG. 5, the BS 101-1 transmits (e.g., repeatedly, according to a timing schedule defined in a PRS configuration) a PRS 121 in a PRS resource using a transmit beam 311 in the direction of the UE 102; likewise, the BS 101-2 transmits a PRS 122 in a PRS resource on a transmit beam 312 into the direction of the UE 102; and the BS 101-3 transmits a PRS 123 in a PRS resource on the transmit beam 313 towards the UE 102.

While in the scenario of FIG. 5, three BSs 101-1-101-3 participate in the positioning of the UE 102, as a general rule, it would be possible that only a single BS, two BSs or four or more BSs participating said positioning.

The UE 102 can identify or at least reference the respective transmit beam used by the BS 101 by means of an associated PRS resource ID. In prior-art implementations of DL-AOD-based positioning, the AOD 191-193 is measured by reporting the beam 311-313 (i.e., the associated PRS resource ID) that the BS 101-1-101-3 was using when transmitting the PRS 121-123 arriving at the highest RSRP at the UE 102. The identification of the "right" beam is important for the accuracy of AOD-based positioning. In 3GPP LTE release 16, the identification is based on the RSRP; in addition, techniques are disclosed herein, which facilitate determining the "right" beam based on the CIR 800. This provides for an increased accuracy. It is important to note that the accuracy of the AOD estimated based on the RSRP of the PRSs 121-123 according to prior-art techniques crucially relies on the beamwidth of the beams 311-313: The estimation error becomes larger when the beamwidth increases. As an example, for the gNB or Transmission-Reception Point (TRP) antenna in frequency range (FR2) specification (i.e 24.25 GHz to 52.6 GHz), eight horizontal antenna elements in one sector give 15 degree of resolution which can cause a significant error in the estimation of the AOD 191-193. By using techniques to estimate the AOD based on the CIR, it is possible to obtain a higher accuracy in this estimation, even beyond the beamwidth. This is because the AOD is estimated based on the CIR, and not tied to the transmission profile of the TX beam 311. The AOD-based positioning can be improved.

Positioning can include determining the AOD 191 of the PRS 121, and/or the AODs 192-193 of the PRSs 122-123. For instance, if the positioning is based only on the AOD 191 of the PRS 121 transmitted by the BS 101-1 using the transmit beam 311, then it is already possible to perform a rough estimation of the position of the UE 102, e.g., taking into additional account the path loss of the PRSs 121 for deriving the distance between the BS 101-1 and the UE 102.

In other examples, it would be possible that the positioning is based on the AODs 191-193 of all PRSs 121-123 transmitted by the multiple BSs 101-1-101-3; in such a scenario, triangulation or, more generally, multilateration can be employed.

As a general rule, the position of the UE 102 may be estimated at the LS node 120 (cf. TAB. 1, variant B); in some scenarios, it would also be possible that the position of the UE 102, or at least the AOD(s) 191-193 is estimated at the UE 102 (cf. TAB. 1, variant A). This can mean that, either, the LS node 120 estimates the AOD(s) and/or the position of the UE 102; or that the UE 102 estimates the AOD(s) and/or the position of the UE 102.

Details with such determining of the AOD(s) and the position of the UE 102 are illustrated in connection with FIG. 6.

Figure 6:
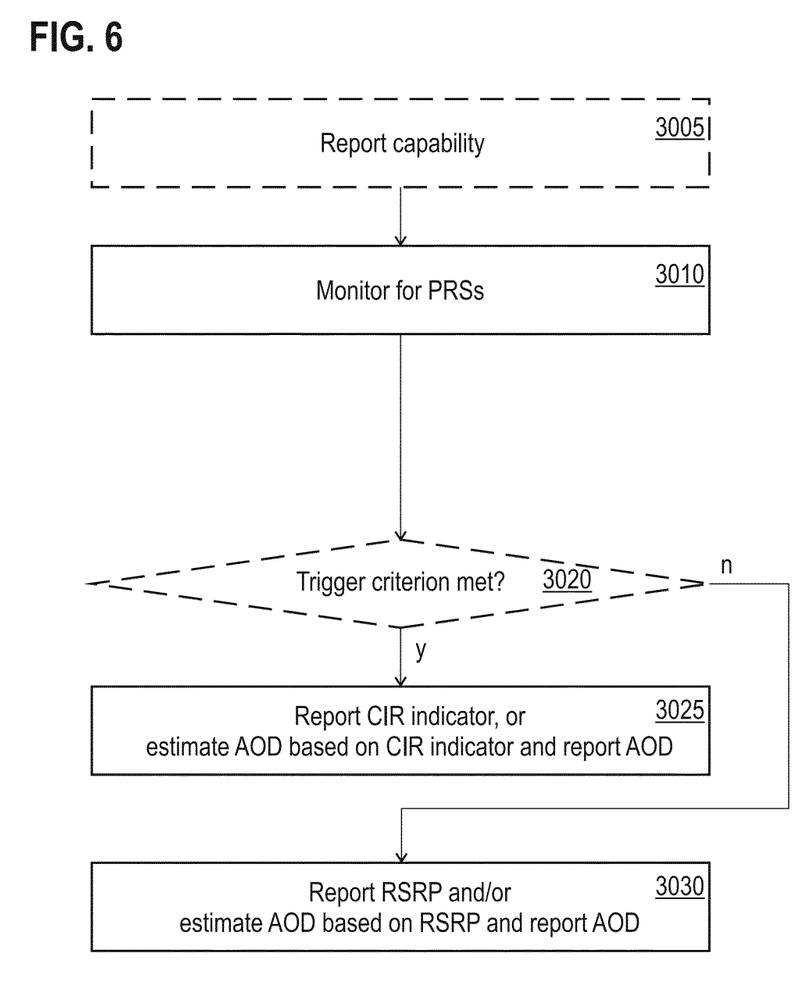
FIG. 6 is a flowchart of a method according to various examples.

FIG. 6 is a flowchart of a method according to various examples. For instance, the method of FIG. 6 may be executed by the processor 1021 of the UE 102, e.g., upon loading program code from the memory 1025. FIG. 6 illustrates aspects with respect to participating in positioning of the UE 102. Optional boxes are marked with dashed lines.

At optional box 3005, a capability of the UE to participate in said positioning depending on the CIR indicator is reported to the cellular network. For instance, it would be possible that the UE 102 reports whether it is able to determine the CIR indicator to be used for AoD or not. For instance, it would be possible that the UE 102 reports whether it prefers to use the RSRP to estimate the AOD, or whether it prefers to determine the CIR indicator for estimating the AOD.

It would be possible that the report is requested from the cellular network and that the UE reacts with the respective capability message to the request.

It would be possible that, as part of box 3005, the UE receives a configuration message from the network in accordance with its capability to participate in said positioning based on the CIR indicator. For instance, if the UE indicates that it is capable to participate in said positioning based on the CIR indicator, the cellular network may activate or deactivate positioning based on the CIR indicator.

The capability may be reported to the LS node 120 using the positioning protocol 119 (cf. FIG. 5). A configuration may be received from the LS node 120 using the positioning protocol 119.

Next, at box 3010, the UE attempts to receive PRSs transmitted by one or more BSs; i.e., the UE monitors for the PRSs (cf. FIG. 5; PRSs 121-123). The UE is typically received the PRS configuration of one or more BSs from LS using the positioning protocol 119 (cf. FIG. 5).

This monitoring may be in accordance with a network configuration. The network configuration may indicate time-frequency resources of a time-frequency resource grid in which the PRSs are transmitted. A timing of respective DL multi-beam transmissions may be indicated. Time-frequency resources may be discriminated between different beams of the multi-beam transmission. The time-frequency resource of a PRS transmission using a spatial transmission filter is known as PRS resource and it has an identity (ID). A multitude of PRS resources of the multi-beam transmission using multiple spatial transmission filters is known as PRS resource set. Both PRS resource and PRS resource set can be part of the PRS configuration.

As the UE has received PRS configuration of one or more BSs. The UE may receive one or more of the PRSs of a multi-beam transmission or multi-beam transmissions (if multiple BSs transmit PRSs).

Then, at box 3020, the UE checks whether one or more trigger criteria are met. The one or more trigger criteria can specify whether the UE is configured/allowed to use the CIR indicator when participating in the positioning. The one or more trigger criteria can specify whether a CIR measurement to obtain the FPC(s) is activated or deactivated. The one or more trigger criteria may be predefined.

As a general rule, various trigger criteria are conceivable. A few examples are summarized in TAB. 2 below.

TABLE 2

Examples of trigger criteria to be used by the UE to decide whether to participate in said positioning based on the CIR indicator, or not. For instance, multiple such trigger criteria may be employed. Cumulated trigger criteria could be defined.

| Example | Brief description | Illustrative details |
|---|---|---|
| A | Network configuration | For example, the cellular network may activate or deactivate use of the CIR indicator for positioning. As described above in connection with box 3005, this can be in accordance with capabilities reported by the UE. For example, an activation/deactivation message may be received from the communications network to activate or deactivate CIR-based AOD estimation. Thereby, the use of CIR-based AOD estimation can be tailored, e.g., to mission-critical or high accuracy use cases, otherwise reducing complexity. |
| B | Magnitude of FPC of CIR | For instance, it would be possible that the UE determines the CIR and then checks whether one or more characteristics of the CIR fulfil one or more predefined criteria. Thus, the trigger criterion may be defined with respect to the CIR (if compared to the non-CIR trigger criterion of example A above). One specific scenario would relate to determining the magnitude of the FPC(s), e.g., based on Eq. (2). Then, it would be possible to compare this magnitude with a predefined reference threshold (this predefined reference threshold may be above the threshold 812, cf. FIG. 4). For example, the predefined reference threshold may be signaled by the network, i.e., be network configured, see example A. For instance, it could be assumed that only if the magnitude exceeds the predefined reference threshold, the magnitude of the FPC(s) of the CIR is sufficiently above the noise floor to enable an accurate positioning based on the CIR indicator indicative of the magnitude and/or phase of the FPC(s). |
| C | Relative quality of the FPC | While the magnitude of the FPC(s) - in absolute terms - can in some examples serve as an indicator indicative of the quality of the FPC(s), in other examples, it would be possible to consider a relative quality of the FPC(s), i.e., the relative quality can be defined based on a comparison of the magnitude of the FPC(s) with the magnitude of one or more further path components of the CIR, e.g., the second path component. To give an example, it would be possible to perform a comparison between - firstly - the magnitude of the FPC(s) of the CIR and - secondly - the magnitude of the second path component of the CIR. Then, the result of this |

TABLE 2-continued

Examples of trigger criteria to be used by the UE to decide whether
to participate in said positioning based on the CIR indicator,
or not. For instance, multiple such trigger criteria may be
employed. Cumulated trigger criteria could be defined.

| Example | Brief description | Illustrative details |
|---|---|---|
| | | comparison can be compared against a predefined reference threshold. The trigger criterion could be considered met if the magnitude of the FPC(s) is larger than the magnitude of the second path component by a predefined factor defined by the predefined reference threshold. For example, the predefined factor may be signaled by the network. The predefined factor may be network configured, see example A. Again, as already explained in connection with example B above, by such techniques, can be avoided that the positioning is based on the CIR indicator in a scenario in which the CIR indicator can only be determined comparably unreliable, e.g., because the quality of the $1^{st}$ path component is poor. The relative quality of the FPC(s) may also be defined otherwise, e.g., with respect to the noise floor, on depending on a time-domain distance in the PDP 801 to a neighboring path component. |

As will be appreciated from TAB. 2, some of the illustrated trigger criteria (examples B and C) depend on one or more characteristics of the CIR itself. Accordingly, it would be possible that, prior to checking whether the one or more trigger criteria are being met at box 3020, the UE 102 is configured to determine the CIR, specifically one or more such characteristics used in connection with the check at box 3020. For instance, the UE may execute Eq. (2), i.e., perform the correlation of the received signal shape of a respective PRS and the input or pre-stored signal shape of the respective PRS, to determine the CIR indicator. Then, the CIR indicator can be compared against a predefined metric to check whether one or more CIR-based trigger criteria are met.

In other examples, the determining of the CIR indicator may be subject to the positive outcome of the one or more trigger criteria being met at box 3020, e.g., in the example A of TAB. 2.

Upon one or more trigger criteria being met at box 3020, at box 3025, the CIR indicator is reported to the cellular network (cf. TAB. 1, variant B). For example, the UE 102 can transmit a respective report message that is indicative of the CIR indicator, e.g., includes the CIR indicator or includes a representation of the CIR indicator or includes a subfraction of the CIR indicator.

More specifically, it would be possible that the CIR indicator is reported to the LS node 120 using the positioning protocol 119.

The CIR indicator is indicative of one or more FPCs of the CIR as determined by monitoring one or more PRS resources of multiple PRS resources (e.g. in a multi-beam transmission). As a general rule, the CIR indicator can be indicative of the FPCs of the CIR determined using multiple PRS resources of the multi-beam transmission. For example, where the multi-beam transmission includes N beams, it would be possible that M≤N PRSs are received on the different beams and the CIR indicator can indicate the FPCs determined based on the CIR derived from each of these M PRSs. Non-reported PRSs can be assumed to have not been received, i.e., there is no respective component of the CIR indicator available or a zero CIR indicator.

As a general rule, it would be possible that the UE reports a scalar representation of the CIR indicator or a complex representation of the CIR indicator. This means that the UE may report the magnitude and phase of the FPC(s) of the CIR indicator; or may only report the magnitude or only the phase. Only reporting the magnitude or the phase can have the positive effect of reducing the required reporting size (e.g. the number of bits). As a general rule, it is possible to estimate the AOD also based on the magnitude of the FPC(s) of the CIR alone, without the phase information.

As a general rule, it would be possible that such message reporting the CIR indicator indicates the FPC(s) by reference to a predefined codebook and/or PRS resource ID. For instance, the predefined codebook and/or PRS resource ID could define different value ranges and an index of the particular value range including the magnitude and/or phase of the FPC(s) could then be signaled by the message.

In yet a further example, it would be possible that the message includes a normalized representation of the FPCs of the CIR indicator. This normalization can be with respect to the strongest FPC observed for PRSs transmitted on different beams (cross-PRS normalization); or it would be possible that, for each received PRSs, the respective FPC of the accordingly determined CIR is normalized with respect to the remaining paths of that particular CIR.

As a general rule, it would be possible that additional information is reported to the cellular network at box 3025. For instance, it would be possible that the UE further reports a further indicator that is indicative of the relative quality of the FPC(s) of the CIR with respect to one or more further path components of the CIR and/or with respect to the noise floor, see TAB. 2, example C. Alternatively or additionally, it would also be possible that the UE selectively reports the delay of the FPC(s) of the CIR. For instance, the relative quality and/or the delay and/or other characteristics may be reported for such PRS resources of the multi-beam transmission for which also the FPC(s) are reported. Such and other characteristics of the CIR can further facilitate an accurate positioning, i.e., a more accurate determining of the AOD. Such additional information can be used to even more accurately estimate the AOD.

Above, a scenario has been described in which the CIR indicator (and, optionally, further characteristics of the CIR, as explained above) is reported to the LS node 120 (cf. TAB. 1, variant B), i.e., the UE 102 participates in said positioning by transmitting a message which is indicative of the CIR indicator to the network. Then, e.g., the LS node 120 can estimate the AOD based on the message or more specifically the CIR indicator and optionally one or more further CIR-related indicators indicated by the message.

In other scenarios (cf. TAB. 1, variant A), it would be possible that the UE 102 participates in said positioning by estimating the AOD locally based on the CIR indicator (and, optionally, based on further characteristics of the CIR, e.g., the relative quality of the FPC of the CIR and/or the delay of the FPC of the CIR, as explained above). Furthermore, such estimating of the AOD could be based on a scalar representation or a complex representation of the CIR indicator.

As a general rule, when estimating the AOD based on the CIR indicator, it is possible to sum over the FPC(s) of the CIR indicator ($R_i(\tau_{FP})$) derived from measurements on partly or all transmit beams of the PRS transmission in multiple PRS resources (e.g. multi-beam transmission). This yields the estimated channel coefficient in spatial domain:

$$\hat{g}(\phi) = \frac{\sum_{l=1}^{M} P_l(\phi) R_l(\tau_{FP})}{\sum_{l=1}^{M} |R_l(\tau_{FP})|^2}, \quad (3)$$

where N is the number of beams or PRS resources and M≤N (e.g., only M<N FPCs could be signaled, as will be explained in detail with respect to TABs. 4 and 5 below). Thus, the summation can be across PRS resources (e.g. within a PRS resource-set) or—e.g., the "best"—M<N PRS resources that the UE has been configured by the LS (here, an appropriate metric for defining what "best" means can be used, e.g., the quality of the FPC of the CIR). $P_l(\phi)$ is the beam pattern of each beam, $\tau_{FP}$ is the estimated FPC delay from PDP, $R_l(\tau_{FP})$ is the complex amplitude of the cross-correlation at delay $\tau_{FP}$, see Eq. (2).

Based on Eq. (3), the AOD can be estimated as:

$$\phi_{UE} = \arg\max |\hat{g}(\phi)| \quad (4).$$

It is assumed that the beam patterns $P_l(\phi)$ is known by the LS or UE in advance, e.g., LS knows by receiving the PRS beam configuration from gNB using NR PPa protocol and UE knows by receiving respective PRS beam configuration from LS using LPP protocol.

The above is one method to estimate the AOD based on Eqs. (3) and (4); there are other method/variants based on the same parameters as shown above. For example, the denominator of Eq. (3) could be rather $\Sigma_{l=1}^{M}|P_l(\phi)|^2$.

In optional box 3030, the RSRP is reported or the RSRP is used to estimate the AOD based on reference techniques (e.g., by selecting the direction of PRS with the strongest RSRP observed for multiple PRSs of the multi-beam transmission). Thus, box 3030 can equate to a fallback to legacy implementations, which—in the illustrated example—is conditional on the one or more trigger criteria not being met at box 3020. In other examples, it would be possible that reporting of the RSRP and/or locally estimating the AOD (i.e., UE-based positioning) based on the RSRP is not conditional on one or more of the trigger criteria not being met at box 3020; rather, such positioning based on the RSRP may be statically activated. For illustration, an average between the RSRP-based estimation of the AOD and the CIR-based estimated of the AOD could be determined when positioning the UE, if both the CIR and the RSRP are measured.

Figure 7:
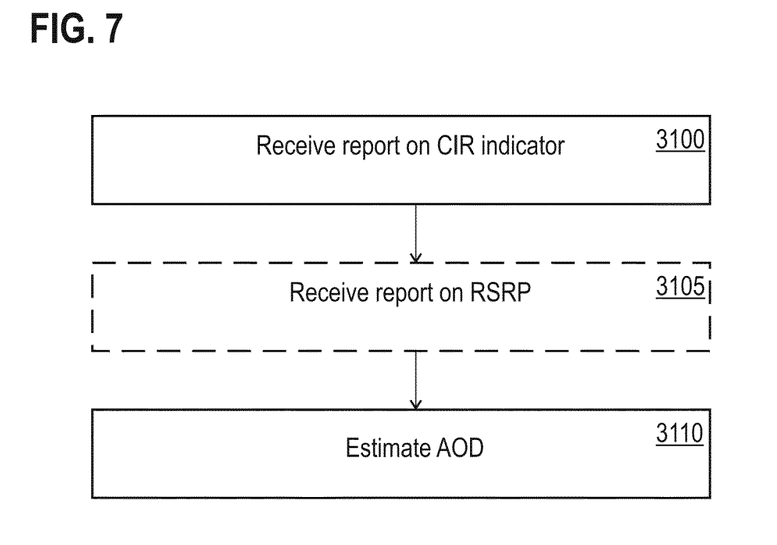
FIG. 7 is a flowchart of a method according to various examples.

FIG. 7 is a flowchart of a method according to various examples. For instance, the method of FIG. 7 may be executed by a LS node 120, e.g., by a processor thereof upon loading program code.

The method includes, at box 3100, receiving a report on a CIR indicator. As such, box 3100 is inter-related with box 3025 (cf. FIG. 6). As explained above, the message could be indicative of a complex or scalar representation of one or more FPCs of the CIR indicator. The message could indicate the one or more FPCs of the CIR indicator by reference to predefined codebook. The message could include the one or more FPCs of the CIR indicator in a normalized manner or in absolute terms.

At optional box 3105, a report on the RSRP of one or more PRSs is received. Box 3105, is thus interrelated with box 3030 (cf FIG. 6).

At box 3110, the AOD is estimated. This is based on the messages of box 3100 and, if available, of box 3105. For example, Eqs. (2), (3), and (4) can be used.

Figure 8:
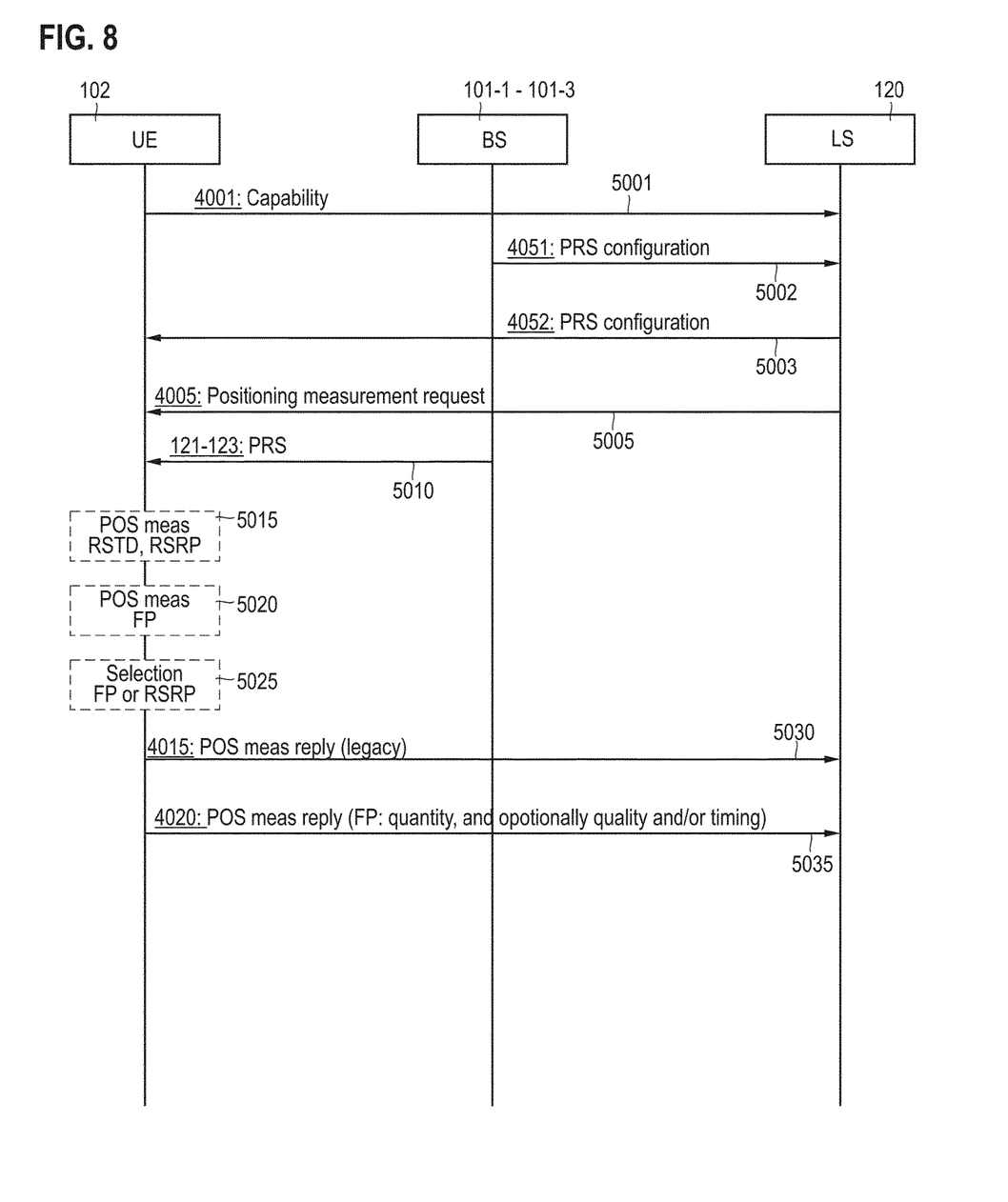
FIG. 8 is a signaling diagram according to various examples.

FIG. 8 is a signaling diagram according to various examples. FIG. 8 illustrates the communication between one or more BSs 101-1-101-3, the UE 102, and the LS node 120. The communication between the UE 102 and the LS node 120 can be in accordance with the positioning protocol 119.

At 5001, the UE 102 transmits a message 4001 that is indicative of its capability to participate in its positioning based on the CIR indicator (that is indicative of the magnitude and/or phase of the FPC of the CIR). 5001, thus, implements box 3005 of FIG. 6.

At 5002, the BSs 101-1-101-3 each transmit a respective control message 4051 including the PRS configuration, the PRS configuration including PRS beam configuration (i.e., spatial filters of the multi-beam transmission, e.g., $P_l(\phi)$ in Eq. (3)) and PRS resource configuration (i.e., time-frequency resources for the UE to monitor), to the LS 120. At 5003, the LS 120 can further forward some or all of the PRS configurations to the UE using LPP protocol, using message 4052. For instance, in a UE-based positioning (cf. TAB. 1, variant A) the message 4052 can include the PRS configuration including PRS beam configuration and PRS resource configuration; while in a network-based positioning (cf. TAB. 1, variant B), the message 4052 can include the PRS configuration including the PRS resource configuration, but not the PRS beam configuration (which, in this case, may not be required by the UE, since the calculation according to Eq. (3) is implemented at the LS 120).

At 5005, the LS node 120 transmits a positioning measurement request 4005 to the UE 102. The positioning measurement request 4005 is indicative of the AOD to be measured. Optionally, the positioning measurement request 4005 could include a command requesting the UE 102 to participate in the positioning based on the CIR indicator. This could be aligned with the capability as indicated by the message 4001.

Then, the PRSs 121-123 are transmitted on respective multi-beam transmissions of (e.g. PRS in multiple resources to form a beam-sweeping) by the BSs 101-1-101-3, at 5010. This is in accordance with the PRS configurations of 5002 and 5003. The UE 102 monitors for these PRSs 121-123 (cf. FIG. 6: box 3010).

Based on at least one received positioning referencing are 121-123, the UE 102 can then participate in said positioning at box 5015 by determining the RSRP and/or RSTD. The UE 102 can determine such characteristics of one or more receive properties of the PRSs 121-123. Optionally, the UE 102 can determine an AOD based on such characteristics.

At box 5020, the UE can determine the CIR indicator. This can include performing the correlation between the input signal shape of the PRS and the received signal shape of the PRS according to Eq. (2).

Optionally, at box 5020, the UE can also estimate the AOD based on the CIR indicator. This can include executing Eqs. (3) and (4). In other examples, this task of estimating the AOD based on the CIR indicator can be offloaded to the LS node 120.

At optional box 5025, a selection between participating in the positioning based on the RSRP and/or based on the CIR indicator is made. This can include checking whether one or more trigger criteria are being met, as explained above in connection with box 3020 of FIG. 6. Depending on the outcome, a positioning measurement report message 4015 and/or a positioning measurement report message 4020 is transmitted. The positioning measurement report messages 4015, 4020 could be standardized in the LPP protocol TS 37.355

Firstly, considering a scenario in which the selection at box 5025 yields that the positioning is not to be based on the CIR indicator. Then, it would be possible that a positioning measurement report message 4015 is transmitted at 5030 which is indicative of the RSRP to facilitate estimating the AOD at the LS node 120. Alternatively, it would be possible in such a scenario that the measurement report message 4015 is transmitted already including the AOD locally estimated at the UE 102 at box 5015 based on the RSRP.

Secondly, considering a scenario in which the selection at box 5025 yields that the positioning is to be based on the CIR indicator. Then, it would be possible that a positioning measurement report message 4020 is transmitted at 5035 which is indicative of the CIR indicator (cf. TAB. 1, variant B).

For instance, a complex representation or a scalar representation of the one or more FPCs of the CIR indicator may be included in the positioning measurement report message 4020. The positioning measurement report message 4020 may include the one or more FPCs of the CIR indicator in absolute terms, or by reference to a predefined codebook. The positioning measurement report message 4020 may include the one or more FPCs of the CIR indicator in a normalized representation. Then, the LS node 120 can estimate the AOD based on such information regarding the CIR. Alternatively, it would be possible that in such a scenario the measurement report message 4020 is transmitted already including the AOD locally estimated at the UE 102 at box 5020 based on the CIR indicator (cf. TAB. 1, variant A).

An example information content of the positioning measurement report message 4020 is summarized in TAB. 3:

TABLE 3

Example implementation of the positioning measurement report message 4015 being indicative of the CIR indicator that is indicative of the FPCs of the CIR determined for PRSs transmitted on multiple beams 301-309 (cf. FIG. 3).

<<List of magnitudes of FPCs of CIR:
First beam - 0
Second beam - 0
Third beam - 0.7
Fourth beam - 0.9
Fifth beam - 0.6
Sixth beam - 0.4
Seventh beam - 0.2
Eighth beam - 0
Ninth beam - 0.2>>

In the example of TAB. 3, the magnitude of the FPCs of the CIR determined based on the PRSs as transmitted on the different beams 301-309 of the multi-beam transmission 351 are all normalized to "1" with respect to the magnitudes of all paths as observed for each individual PRS resource measurement (this corresponds to the normalization discussed in connection with FIG. 4); as an alternative, it would be possible to normalize between the FPCs determined based on the PRSs transmitted on different beams (i.e., cross-PRSs normalization), possibly restricted to those that are reported. This is illustrated in TAB. 4, here, the fourth beam serves as the normalization reference, and hence takes the magnitude "1" (another normalization reference would be possible, e.g., the sum of all reported FPCs, etc.)

TABLE 4

Example implementation of the positioning measurement report message 4015 being indicative of the CIR indicator that is indicative of the FPCs of the CIR determined for PRSs transmitted on multiple beams 301-309 (cf. FIG. 3).

First beam - 0
Second beam - 0
Third beam - 0.3
Fourth beam - 1
Fifth beam - 0.4
Sixth beam - 0
Seventh beam - 0.1
Eighth beam - 0
Ninth beam - 0.2>>

In the example of TAB. 4, the positioning measurement report message 4015 includes the CIR indicator indicating the FPCs of the CIR determined for all PRS resource IDs of a PRS resource set, i.e., includes all N FPCs, cf. Eq. 3. In other examples, it would be possible that only M<N FPCs are reported. This is illustrated in TAB 0.5 which is based on the scenario of TAB. 4.

TABLE 5

Example implementation of the positioning measurement report message 4015 being indicative of the CIR indicator that is indicative of the FPCs of the CIR determined for PRSs transmitted on multiple beams 301-309 (cf. FIG. 3). In the example of TAB. 5, only the M = 5 < N = 9 best FPCs are reported. I.e., the count of reported FPCs (M) is smaller than the count of PRS resources/beams of the multi-beam transmission (N). The count is larger than 1, however; M > 1.

<<List of FPCs of CIR:
Third beam - 0.3
Fourth beam - 1
Fifth beam - 0.4
Seventh beam - 0.1
Ninth beam - 0.2>>

The metric to determine the (e.g., best) FPCs to-be-reported can vary according to different implementations. For example, the metric could be network defined. It would be possible that the number of FPCs to be reported, M, is network defined. For instance, it would be possible to report the M strongest FPCs. It would be possible to report only those FPCs that have a relative quality above a certain threshold, as explained above. Accordingly, the count M of FPCs to be reported can be network-defined. The count could be defined by a (e.g., network-configured) parameterization that depends on the quality of the FPCs, as explained above.

Note that while in the scenarios of TAB. 3 to TAB. 5 the magnitude of the FPCs of the CIR determined based on PRSs of different spatial transmission filters of the multi-beam transmission is reported, alternatively or additionally, it would be possible to report the phase of the FPCs. For illustration, also the phase may be reported in a normalized manner. E.g., in the scenario of TAB. 4, the fourth beam may have, per definition, phase 0°.

Summarizing, techniques have been described which facilitate accurate positioning of a UE. In particular, the AOD of one or more PRSs transmitted towards the UE by one or more BSs can be estimated. According to the techniques described herein, one or more characteristics of a CIR are used to estimate the AOD. This is different to reference implementations which rely on the RSRP to estimate the AOD.

One particular characteristic of the CIR that can be relied upon to estimate the AOD is the FPC. Here, respective CIR indicator that is indicative of the FPC of the CIR can be used to estimate the AOD.

For example, a message could be transmitted that is indicative of the CIR indicator. For example, the message could include a scalar representation or a complex representation of the CIR indicator.

As a general rule, this message indicative of the CIR indicator, or one or more further messages may indicate further characteristics of the CIR. For instance, it would be possible that the message or the one more further messages are indicative of at least one further indicator that is indicative of a quality of the FPC of the CIR and/or a delay of the FPC of the CIR.

Techniques have been described which facilitate determining the CIR indicator based on measurements of one or more receive properties of PRSs. A correlation between the received signal shape and input signal shape of the PRSs may be performed to derive the FPC of the CIR.

Such positioning to estimate the AOD based on one more characteristics of the CIR can replace or complement positioning to estimate the AOD based on RSRP. For example, the particular mode of positioning—i.e., (i) estimating AOD based on one or more characteristics of the CIR such as the CIR indicator indicative of the FPC of the CIR, or (ii) estimating the AOD based on the RSRP—can be activated depending on one or more trigger criteria. One example trigger criterion includes network configuration. For example, an LS node of the communications network can instruct which mode of positioning—i.e., (i) and/or (ii)—to use.

Above, techniques have been described which facilitate estimating the AOD at the communications network, e.g., at the LS node. Alternatively or additionally, it is also possible to estimate the AOD at the UE for UE-based positioning. Cf. TAB. 1.

Further, techniques have been described which facilitate reporting of respective measurement capabilities of the UE to determine the one or more characteristics of the general impulse response.

Simulations have been performed to compare the accuracy of the estimation of the AOD between prior-art techniques that are based on the RSRP of PRSs (i.e., corresponding to the sum across all paths), and techniques as described herein which estimate the AOD based on the CIR indicator. It has been found that 5% to 10% higher accuracy can be achieved for the AOD expressed in degrees, e.g., in a "open office" channel environment. Results of the comparative study are illustrated in TAB. 6 below.

TABLE 6

Mean estimated AOD error as obtained from simulations assuming an indoor open office scenario. Indoor open office was assumed to have the following parameters in the simulation: 120-meter length, 50-meter width and 3-meter height. The non-line-of-sight probability in open office environment was 13%.

|  | CIR indicator (complex) | CIR indicator (absolute) | Channel coefficient (complex) | RSRP (absolute) |
|---|---|---|---|---|
| Mean estimated AOD error/degree | 18.4 | 21.3 | 26.0 | 26.4 |

Although the disclosure has been shown and described with respect to certain preferred embodiments, equivalents and modifications will occur to others skilled in the art upon the reading and understanding of the specification. The present disclosure includes all such equivalents and modifications and is limited only by the scope of the appended claims.

For illustration, various techniques have been described in the context of DL PRSs and corresponding estimation of AOD. Similar techniques may be readily applied to other PRSs, e.g., uplink PRSs and/or sidelink PRSs. For further illustration, various examples have been described enabling positioning based on PRSs. In other examples, other types of reference signals can be employed, e.g., SRSs, e.g., sidelink SRS, UL SRS, etc. Furthermore, various techniques have been described in the context of a cellular network. Other kinds and types of networks may be subject to the techniques described herein.

For still further illustration, various techniques have been described in which the estimation of the AOD is based on the FPC(s) of the CIR. Alternatively or additionally, one or more other characteristics of the CIR may be considered in the estimation of the AOD, e.g., the second path component of the CIR. This may be helpful, e.g., where the magnitude of the second path component is significantly larger than the FPC of the CIR. A CIR indicator as described throughout the current disclosure may then be used to the indicate the one or other characteristics of the CIR, e.g., in addition or as an alternative to the indicating of the FPC8s) of the CIR.

Still further, various techniques have been described in which the AOD is estimated as part of the positioning based on one more characteristics of the CIR. As a general rule, it would be possible to employ the one or characteristics of the CIR—e.g., the FPC of the CIR—in the estimation of other position indicators, e.g., TOA, TDOA, and/or AOA, etc.

The invention claimed is:

1. A method of operating a wireless communication device connectable to a communications network, the communications network comprising an access node, the method comprising:
    monitoring for a plurality of reference signals of a transmission in a plurality of resources, the transmission being provided by the access node, and
    based on said monitoring: participating in positioning of the wireless communication device depending on an indicator indicative of at least one of a magnitude or a phase of at least one first path component of an impulse response of a radio channel, the at least one first path component being associated with at least one reference signal of the plurality of reference signals of the transmission.

2. The method of claim 1,
    wherein said participating in said positioning of the wireless communication device comprises transmitting a message indicative of the indicator indicative of the at least one of the magnitude or phase of the at least one first path component to the communications network for estimating an angle-of-departure of the at least one reference signal of the plurality of reference signals, or
    wherein said participating in said positioning of the wireless communication device comprises estimating the angle-of-departure of the at least one of the reference signals based on the indicator indicative of the at least one of the magnitude or the phase of the at least one first path component.

3. The method of claim 1, wherein the wireless communication device participates in said positioning based on a complex representation of the indicator or a scalar representation of the indicator.

4. The method of claim 1,
wherein said participating in said positioning of the wireless communication device comprises transmitting a message indicative of the indicator indicative of the at least one of the magnitude or phase of the at least one first path component to the communications network, for estimating an angle-of-departure of the at least one reference signal of the plurality of reference signals,
wherein the message is indicative of the at least one of the magnitude or the phase of the at least one first path component by including a reference to a predefined codebook, or wherein the message includes a normalized representation of the at least one of the magnitude or the phase of the at least one first path component.

5. The method of claim 1, wherein said participating in said positioning is further based on at least one further indicator indicative of a relative quality of the at least one first path component of the impulse response with respect to one or more further path components of the impulse response and/or indicative of a noise floor of the impulse response.

6. The method of claim 1, wherein said participating in said positioning selectively depends upon the indicator indicative of the at least one of the magnitude or the phase of the at least one first path component meeting at least one trigger criterion.

7. The method of claim 6, wherein the at least one trigger criterion comprises a network configuration.

8. The method of claim 6, wherein the at least one trigger criterion comprises a comparison between the magnitude of the at least one first path component and a reference threshold, wherein the reference threshold is optionally configured by the communications network.

9. The method of claim 6, wherein the at least one trigger criterion comprises a comparison between a relative quality of the at least one first path component defined with respect to one or more further path components of the impulse response or a noise floor of the impulse response, and a reference threshold, wherein the reference threshold is optionally configured by the communications network.

10. The method of claim 6, further comprising:
selectively transmitting, to the communications network, a message indicative of a further indicator indicative of a received signal power of the at least one reference signal of the plurality of reference signals, depending on the at least one trigger criterion.

11. The method of claim 1, further comprising:
reporting, to the communications network, a capability to participate in said positioning depending on the indicator indicative of the at least one of the magnitude or the phase of the at least one first path component.

12. The method of claim 1, wherein said participating in said positioning is further based on at least one further indicator indicative of a delay of the at least one first path component of the impulse response.

13. The method of claim 1, further comprising:
performing a reference signal measurement comprising cross-correlation between a received signal shape of the at least one of the reference signals and an input signal shape of the at least one of the reference signals, to determine the indicator indicative of the at least one of the magnitude or phase of the at least one first path component.

14. The method of claim 13, wherein said performing of the reference signal measurement is in response to a respective activation request received from the communications network.

15. The method of claim 1, wherein the indicator is indicative of the at least one of the magnitude or phase of multiple first path components of the impulse response of the radio channel associated with multiple reference signals of the plurality of reference signals.

16. The method of any one of claim 15, wherein a count of the multiple reference signals is smaller than a count of reference signals included in the plurality of reference signals.

17. The method of claim 16, wherein the count is network-configured and/or defined by a parameterization depending on a quality of the first path components.

18. The method of claim 1,
wherein said participating in said positioning of the wireless communication device comprises estimating the angle-of-departure of the at least one of the reference signals based on the indicator indicative of the at least one of the magnitude or the phase of the at least one first path component,
wherein the method further comprises:
receiving, from the communications network, a message indicative of spatial filters associated with the multiple resources of the transmission,
wherein the angle-of-departure is estimated based on the spatial filters.

19. A method of operating a network node of a communications network, the method comprising:
receiving, from a wireless communication device, a message indicative of an indicator indicative of at least one of a magnitude or a phase of at least one first path component of an impulse response of a radio channel, the at least one first path component being associated with at least one reference signal of a plurality of reference signals of a transmission in multiple resources, the transmission being provided by an access node of the communications network, and
estimating an angle-of-departure of the at least one reference signals based on the indicator indicative of the at least one of the magnitude or the phase of the at least one first path component.

20. The method of claim 19, further comprising:
receiving, from the access node, a message indicative of spatial filters associated with the multiple resources of the transmission,
wherein the angle-of-departure is estimated based on the spatial filters.

* * * * *